Nov. 14, 1967

R. A. DASPIT 3,352,575

PIPE COUPLING FOR HIGH-PRESSURE GAS AND OIL UNDERWATER
PIPE LINES, AND PROCESS OF INSTALLING SAME

Filed Jan. 7, 1965

INVENTOR

Ronald A. Daspit

BY

*Wilkinson, Mawhinney & Thibeault*

ATTORNEYS

Nov. 14, 1967
R. A. DASPIT
3,352,575
PIPE COUPLING FOR HIGH-PRESSURE GAS AND OIL UNDERWATER
PIPE LINES, AND PROCESS OF INSTALLING SAME
Filed Jan. 7, 1965
3 Sheets-Sheet 2
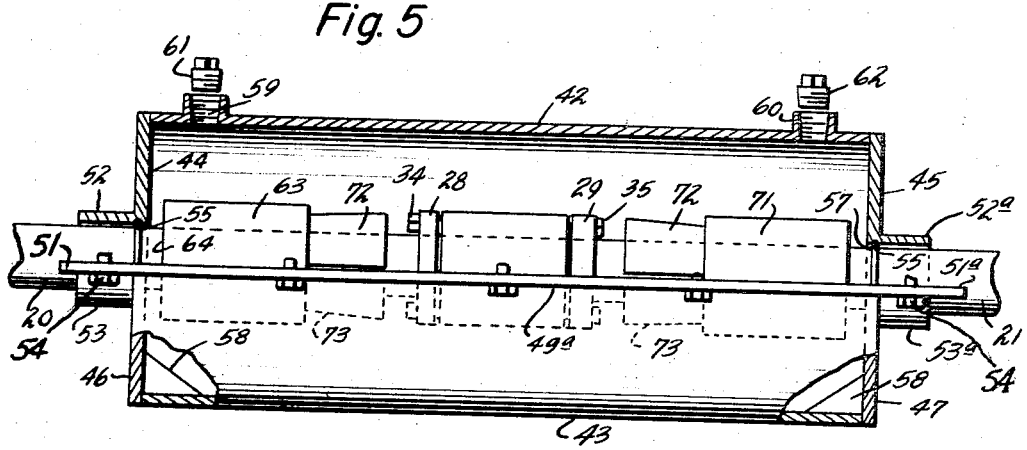
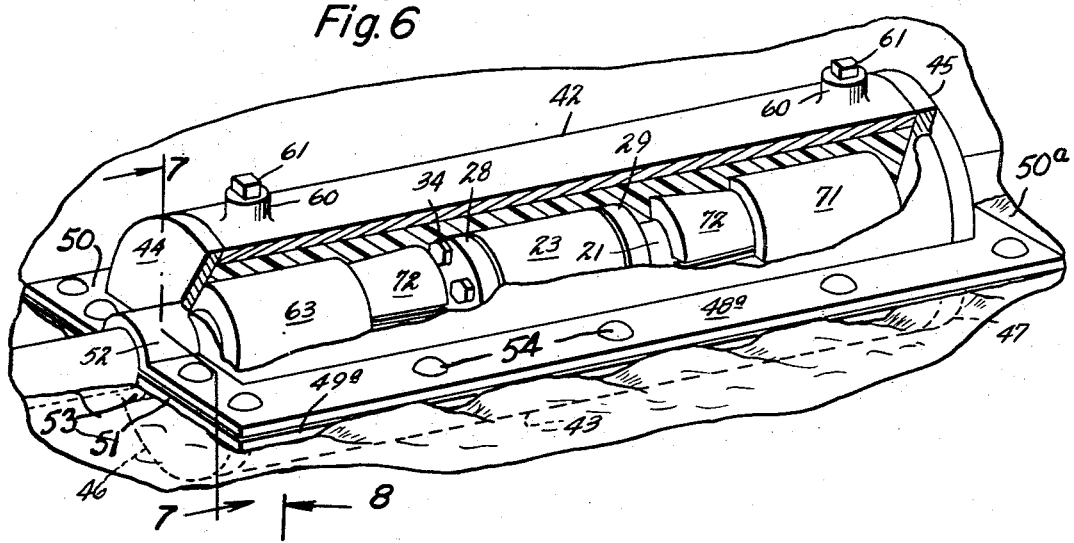
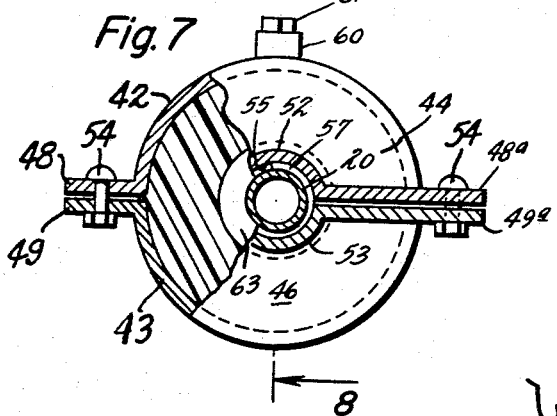
INVENTOR
Ronald A. Daspit
BY Wilkinson, Mawhinney & Thibault
ATTORNEYS

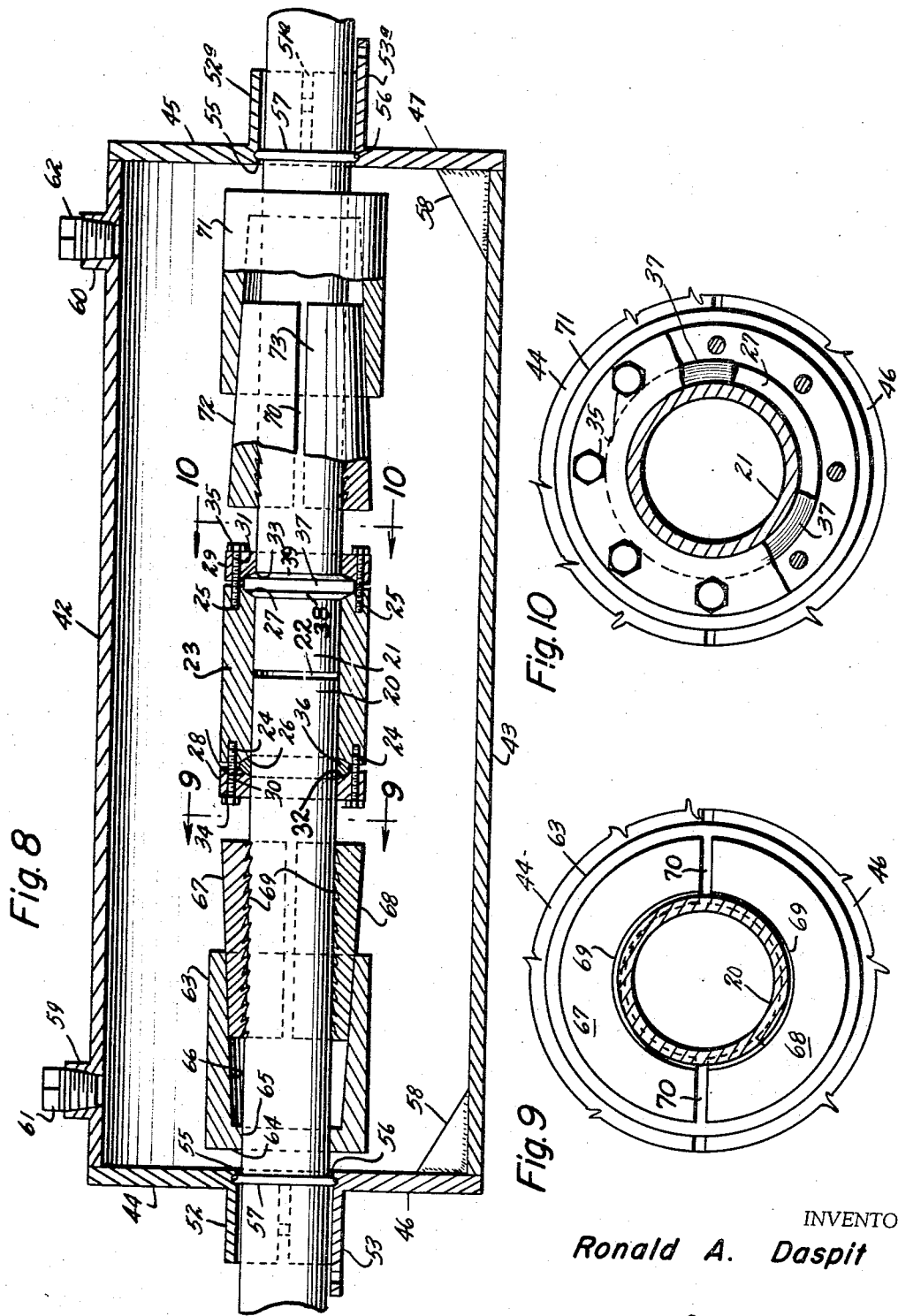

United States Patent Office 3,352,575
Patented Nov. 14, 1967

3,352,575
PIPE COUPLING FOR HIGH-PRESSURE GAS AND OIL UNDERWATER PIPE LINES, AND PROCESS OF INSTALLING SAME
Ronald A. Daspit, 2401 Delille St., Chalmette, La. 70043
Filed Jan. 7, 1965, Ser. No. 423,906
11 Claims. (Cl. 285—45)

The present invention relates to pipe coupling for high-pressure gas and oil underwater pipe lines, and process of installing same. Heretofore to repair a damaged pipe line or lay a new one, a large barge with the necessary machinery and boats must be brought to the location. Subsequently, a diver is sent down to the bottom of the body of water to attach the necessary cables needed to raise and lower the pipe line. All work is done on the deck of the barge, following which the pipe line is again lowered to the bottom of the water.

In most cases, the pipe line lies under a layer of mud and has to be "jetted" out either by hand or by mechanical jets, to remove the covering of mud. If this is not done the chances of "kinking" the pipe on raising it are greatly increased. However, many pipe lines are "kinked" in the process of raising or lowering them regardless of the topside methods used.

Once a pipe line is raised for repairs, in most instances it does not return to the bottom to lie flat but rather it continues to have the hump in the area that was lifted. Such humps increase the hazards of later damage to the line by anchors, trawl boards, etc.

On the installation of pipe line risers, a diver is sent down to the bottom to measure the linear distance between the end of the pipe line and the side of the structure to which the vertical portion "riser" will be clamped. Once this is accomplished the pipe line is raised to the water's surface and the riser is welded with a sufficient section of pipe added in or removed to make up the correct length to reach the structure. If the measurement proves incorrect, the procedure is repeated until the line and riser fit.

Another method of installation is the use of welded flanges bolted to each other at the end of the pipe line and riser. Again the correct length has to be ascertained. In addition, the bolt holes have to be alined before the flanges can be corrected.

During the two methods described above of riser installations the derrick barge has to remain on location in order to assist the diver. These barges range in rental fees from $5,000 to $10,000 per diem. In the event the sea conditions worsen, the job is decidedly hampered due to the fact that the installation work is directly governed by the floating vessel and the crane mounted on it.

With the use of the present apparatus and method, the riser is installed and the end of the pipe line is lowered to the bottom and laid adjacent to the horizontal portion of the riser. The derrick barge is then released and the work boat is brought on location and tied off. The diver then proceeds to cut the pipe line to length and install a coupling according to the invention in the place of the flange. This procedure can be accomplished without the aid of the barge because the pipe does not have to be raised or rotated to get the flange holes to match. Since all of the work is being done on bottom the influence of surface sea conditions has almost no bearing on the completion of the job. The approximate cost of such job is between $600 and $800.

By the use of the invention a derrick barge in the repairs to damaged or leaking pipe lines is not required. A diver working off a boat can sever sections of the pipe line and install new replacement sections incorporating the invention at each severed location.

The pipe line is never subjected to undue stress by raising it to the water's surface for repairs, but remains in its original location on bottom throughout the repair job.

In addition, the danger of damage to other lines in the immediate vicinity by large barge anchors is virtually eliminated since there is only one small boat anchor employed and the diver can readily check it to determine if it is attached to anything on bottom.

With the foregoing and other objects in view, the invention will be more fully described hereinafter, and will be more particularly pointed out in the claims appended hereto.

In the drawings, wherein like symbols refer to like or corresponding parts throughout the several views.

Figure 4:
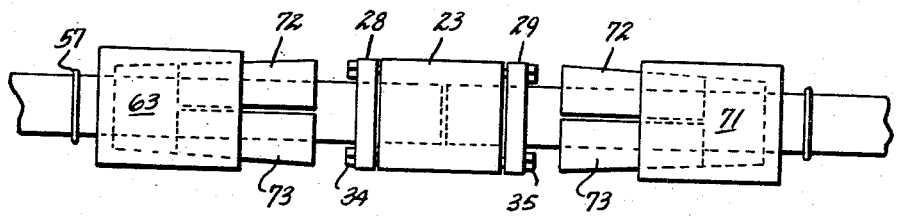

FIGURE 4, illustrative of the fourth step of the process, shows the inner coupling completely in place and the keeper means at least partially in place.

FIGURE 5 is a longitudinal section taken through the outer coupling as applied in place over the inner coupling, keeper means and pipe shown in elevation.

FIGURE 6 is a perspective view with parts broken away and parts shown in section showing the completed job with the mastic or other plastic filler in place and with the plugs in final position.

FIGURE 7 is a vertical cross-sectional view taken substantially on the line 7—7 of FIGURE 6 with parts broken away and parts shown in section.

FIGURE 8 is a longitudinal sectional view taken on the line 8—8 of FIGURE 7 minus the filler material.

FIGURE 9 is a cross-sectional view taken on an enlarged scale on the line 9—9 of FIGURE 8.

FIGURE 10 is a similar view taken on the line 10—10 of FIGURE 8.

Referring more particularly to the drawings, 20 and 21 designate end sections of a pipe separated by a division 22.

The inner coupling comprises generally an inner coupling sleeve 23 which is preferably solid round and may be slipped over, by an axial motion, one of the pipe end sections when the sections are displaced laterally from one another for this purpose and for the purpose of receiving thereover certain female members of a limit device or pipe keeper as hereinafter described.

The inner coupling sleeve is of sufficient axial length to span the division 22 and to extend over the abutted pipe end sections 20 and 21 suitable axial distances in opposite directions from the division 22.

In the ends of the sleeve 23 are screw sockets 24 and 25 opening through such ends and extending circumferentially of the sleeve 23 at suitable angular distances apart. Beveled end portions 26 and 27 of the sleeve 23 converge radially inward of the circumferential succession of sockets 25.

Securing rings 28 and 29 are fitted substantially against opposite ends of the sleeve 23 and have therethrough holes 30 and 31 adapted to register with the screw sockets 24 and 25. These rings 28 and 29 have portions thereof beveled as indicated at 32 and 33 in such relation to the beveled edges 26 and 27 that the pairs of beveled walls 26, 32 and 27, 33 diverge centrally toward the axis of the sleeve 23 and pipe line whereby the effect, when threaded bolts 34 and 35 are tightened in the sockets 24 and 25, will be to squeeze outermost portions of packing or sealing rings 36 and 37 against the outer included circumferential areas on the pipe end sections 20 and 21.

The rings 36 and 37 may be what are well-known in the industry as O-rings and are of well-known appropriate material for applying a tight-leak-proof seal about the pipe end sections 20 and 21 to provide against escape of the fluid under pressure in the pipe.

To this end the circumferential portions of the sealing rings 36 and 37 are outwardly tapered, as indicated at 38 and 39 (FIGURE 8), to flat outermost sections which bridge the separation between the ends of the sleeve 23 and the securing rings 28 and 29.

These parts 23, 28, 29 and 36, 37, with the threaded bolts or other fastenings 34 and 35 for securing the same, together constitute the inner pipe coupling.

An additional outer pipe coupling is also provided comprising generally a casing for sealant material, a satisfactory form of which is illustrated as including a top semi-cylindrical sections 42 and a bottom semi-cylindrical section 43.

The upper semi-cylindrical section 42 is enclosed at its ends by the end plates 44 and 45. In similar manner the lower or bottom casing section 43 is enclosed by the end plates 46 and 47. The casing sections made up of the semi-cylindrical members 42 and its end plates 44 and 45, and semi-cylindrical section 43 and its end plates 46 and 47 have meeting flanges 48, 48ª and 49, 49ª which extend longitudinally along the lengths of the respective sections 42 and 43 and merge beyond the end plates with radial meeting flanges 50, 50ª and 51, 51ª.

These various flanges are perforated in registry to receive bolts 54 by which the sections 42 and 43 are clamped about the pipe end sections 20 and 21.

The end plates 44 and 45 have substantially semi-cylindrical bearings 52 and 52ª projecting out in opposite directions therefrom which are also connected for support to the adjacent radial flanges 50 and 50ª.

In like manner the lower cylindrical sections 43 is provided with complemental semi-cylindrical bearings 53 and 53ª projecting in opposite directions outwardly from the end plates 46 and 47 and being welded or otherwise connected to adjacent inner edge portions of respective radial flanges 51 and 51ª.

The end plates 44 and 45 have top semi-cylindrical recesses 55 made therein so as to register and communicate with similar bottom part-cylindrical recesses 56 in the end plates 46 and 47: so that when the two semi-cylindrical sections 42 and 43 of the casing are assembled together and clamped by the bolts 54, these recesses 55 and 56 will register to form substantially circular recesses for receiving packing or sealing rings 57 in the nature of O-rings or other packing rings of synthetic or other appropriate material.

The lower casing section 43 may be supplied with appropriate gusset plates 58, of triangular or other form, adapting the same to connect between inner surfaces of the bottom cylindrical casing section 43 and its end plates 46 and 47.

When the casing sections 42 and 43 are assembled in place, on account of the substantially greater diameter of the casing over the inner sleeve 23, such casing will afford a substantial chamber for the reception of a large body of sealant material, it being understood that the casing is not only diametrically larger than the inner coupling 23, but also has a substantial axial length in excess of the length of the inner coupling so as to extend in opposite directions well beyond the ends of the pressure rings 28 and 29 to accommodate certain limit or pipe keeper means which will also be enveloped by the sealant material and substantially immobilized thereby.

Suitable openings are made in upper portions of the top casing section 42 to admit initially fluid sealing material in one opening and the escape of fluid from the other opening to avoid vacuum locks. In this instance internally threaded pipe fittings 59 and 60 incorporated in a high portion of the casing wall 42 are adapted to receive screw threaded plugs 61 and 62 which are screwed tightly into place after the sealant is introduced to the casing which constitutes an outer coupling means. On solidification and potential expansion of the sealant material in the casing, the same will also constitute a third coupling and also the limit or pipe keepers, thereby creating a great cylindrical mass of solidly packed sealant material from end walls 44, 46 to opposite end walls 45, 47 and circumferentially throughout the entire area of the casing.

Applied about the pipe end sections 20 and 21 respectively outward from the inner coupling are limit devices or pipe keepers. The limit device at one end of the inner coupling is constituted of a female member 63 having an outer end wall 64 provided with an opening 65 of a diameter just slightly in excess of the external diameter of the pipe section 20 about which it is fitted and axially slidable. Inwardly of this end wall 64 the internal wall 66 of the female sleeve member 63 is frusto-conical having its smaller diameter adjacent the end wall 64 and expanding in diameter progressively to the inner open end of the female sleeve 63.

Cooperating with this member 63 is the male member which comprises at least two part-cylindrical sections 67 and 68 having internal teeth 69 inclined toward the inner coupling so as to tend to bite into the external surface of the pipe end section 20 incident to axial movement of the pipe end section 20 away from the inner coupling which would tend to widen the gap or division 22.

The male members 67, 68 are formed externally with frusto-conical surfaces mating with the frusto-conical inner wall of the female member 66 so that axial movement of the female member 63 toward the inner coupling will force the male sections 67, 68 radially inward upon the pipe section, driving the teeth 69 into the pipe external wall in a slant-wise direction. The male sections 67, 68 will have a combined inner circumference somewhat less than the external pipe wall so that relative axial movement of the female member 63 over the male sections 67, 68 will contract those sections at the gaps 70. The end wall 64 forms a convenient anvil against which to direct blows of a hammer or other implement in order to drive the female member 63 longitudinally relatively to the male sections 67, 68 to thereby firmly entrain the limit or pipe keeper to the pipe section.

In a similar way the other pipe section 21 is provided with a keeper or limit device comprising a similar female member 71 and male members 72 and 73 mounted in an opposite sense with respect to the members 63, 67 and 68 so as to fasten themselves upon the opposite pipe section 21 in a manner to prevent outward creeping of either pipe section 20 and 21, at least to an extent beyond the axial length of the inner coupling sleeve 23 to avoid leakage through the division 22.

It will be understood that when the repair has been made and the inner coupling and limit members all assembled and driven into place, that on application of the outer casing the end plates 44, 45 and 46, 47 will very closely approach the outer end walls 64 of the limit devices so that it will require only a small axial movement of the pipe sections 20 and 21 in a separating direction to cause the end walls of the female members 63 and 71 to abut the walls 44, 46 and 45, 47 so as to arrest pipe section movements to any substantial extent as would create a large gap at the division 22. FIGURES 5 and 8 show that this space is somewhat larger than normal to accommodate therein, when desired, quantities of the sealant material which will normally expand, solidify and harden, to form rigid abutments opposing any outward casual axial movements of the female members 63, 71.

The construction and arrangement is such that the coupling parts may be carried by the diver down to the ocean floor and the entire operation of installing the coupling may be performed in situ at the permanent locus of repair or other operation.

The process or method is as follows:

*First step*

Figure 1:
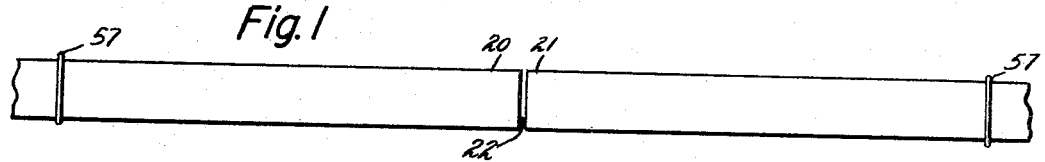
FIGURE 1 is a diagrammatic fragmentary elevation of a pipe illustrating the first step of the process of installation.

This step is illustrated in FIGURE 1. The pipe is severed, at 22, where the coupling is to be installed. All scale and foreign matter is removed externally of the two pipe sections 20, 21 at opposite sides of the division 22. The free ends of the two pipe sections at 22 are moved relatively laterally out of axial alignment so as to permit of slipping of the neoprene or other O-rings 57 thereover, which rings are then pushed in opposite directions from the division 22 a suitable distance approximately in the position to be received by the recesses 55 and 56 of the end walls of the outer casing when that casing is later installed. These O-rings 57 are for the purpose of sealing off any leakage of sealant material that may occur during the pumping or vibrating stages.

*Second step*

Figure 2:
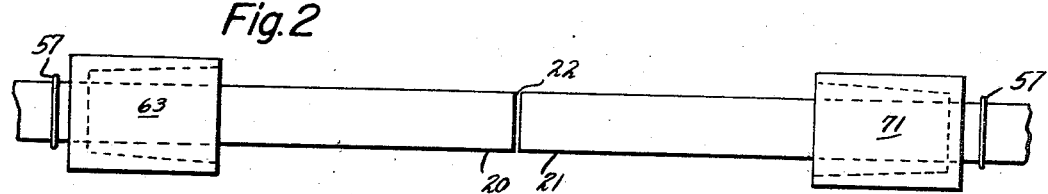
FIGURE 2 is a similar view illustrating a second step involving additional mechanical detail.

While the pipe sections 20 and 21 are displaced relatively the female members 63 and 71 are slid over the pipe sections and made to take up substantially the positions shown in FIGURE 2. These female members are placed in an order that the larger ends of the internal frusto-conical walls thereof face the division 22.

*Third step*

Figure 3:
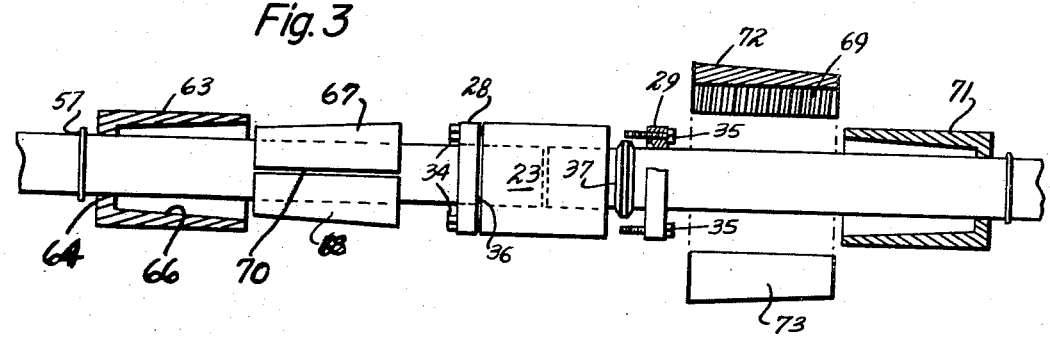
FIGURE 3 is a similar view of the pipe representative of a third step of the process in which the inner coupling is shown bridging the gap at the division between the pipe ends and a preferred order of assembling the keeper means is shown.

Such step is shown in FIGURE 3 in which the inner coupling sleeve 23 is applied over the pipe ends 20 and 21, while the same are displaced axially as are also the sealing rings 36 and 37 and the securing rings 28 and 29. The bolts 34 and 35 being put in place, as indicated in FIGURE 8, the inner coupling is then completely installed. In other words the inner sleeve 23 and its packing is installed and tightened securely.

*Fourth step*

The female members 63 and 71 are backed away from the inner coupling sleeve 23 toward the rings 57 to allow of the placement radially of the sections 67 and 68 of the male members. Once these male members are inserted, as indicated in FIGURE 3, the female members 63 and 71 are hammered toward the division 22 to cause the male members to securely grip the pipe. It will be understood that the male halves do not thread the pipe but by the direction in which the teeth are inclined and the bevels of the exterior surfaces of these members, such members continuously grip the pipe more securely because of the tensile load of the pipe which tends to cause the gap 22 to widen. The retaining or limit-stop factor is the abutting of the outer end walls of the female members 63, 71 against the inside surfaces of the end plates of the outer coupling or against the solidified sealant material, as hereinbefore described.

*Fifth step*

The outer halves 42 and 43 of the outer coupling are carefully placed over the inner components, making certain the O-rings 57 are fitted in the recesses 55 and 56 of the end plates 44, 46 and 45, 47 of the casing halves. Thereafter all bolts 54 are secured in place, clamping the flanges tightly together. If desired, suitable packing may be placed between the flanges.

The distance between the outer end walls of the female members 63, 71 and the end walls of the outer casing will preferably be of the order of 1/16 to 1/8 of an inch. Shims can be used to close completely the gap between the outer end walls of the female members and the casing end plates.

When all bolts are secured, a small pressure vessel containing a suitable volume of "Dascoseal" No. 1 (a portland cement composite which expands slightly on setting), or some other suitable material, is lowered to the diver who previously or then removes the plugs 61 and 62. Air pressure is then exerted on the vessel to drive the sealant material into the casing through one of the openings 59, 60 while the water and air are driven out through the other open coupling 60. All water is thus displaced by the sealant material. The viscosity of the sealant material is approximately that of toothpaste, having about a 1/8 inch to 10 inch slump. As the sealant is introduced the coupling is continuously vibrated with an external vibrator generating, for example, 8,000 to 10,000 c.p.s. This measure is to secure complete permeation of all existing voids and give good placement against the O-rings 57 to prevent leakage outwardly along the pipe sections.

In addition the sealant, by flowing adjacent to the inner coupling O-rings 36 and 37, "locks" these O-rings against the hydrostatic pressure within the pipe line and enables them to withstand considerably higher pressure before failure occurs. This is of extreme importance in the repairs of old pitted and corroded lines.

The inner surfaces of both the male and the female members are preferably greased with a good water resistant grease to insure slippage of the female onto the male halves and to prevent any permeation of the "Dascoseal" or other sealant material. The female members are secured on the male members as close to the end plates 44, 46 and 45, 57 of the outer coupling or casing as is practical (usually within 1/8 of an inch). This gives the female members a firm resting place in the event of a tensile pipe load.

Once the sealant has set and cured, it attains a compressive strength of approximately 7,000 p.s.i. and will keep the male halves of the keeper devices from releasing by backing away from the female members if the pipe is pushed together. It requires little effort on the diver's part to secure these female members with the use of a maul or air hammer. The teeth in male halves are not to thread pipe but are inclined (butterssed) toward the larger end in order to exert continually greater retaining force on the pipe line as a longitudinal stress is exerted. The taper on the exterior of the male halves and the taper of the inner side of the female members is, for example, 1/2 inch to one linear foot.

With the use of the invention the necessity for having a derrick or lay barge on location to repair a damaged or leaking pipe line or to install a new pipe line riser is dispensed with.

The device of the invention is easily installed by marine divers in complete darkness. The inner coupling can be completely disassembled and the same lowered to the diver in separate parts for ease of installation in extremely cold water where gloves are necessary and are a definte deterrent to an efficient job using other methods.

The invention is designed specifically for marine use. It is constructed of considerably heavier metal than that of the pipe itself: therefore, it will last in excess of the projected life span of new pipe. On installation the pipe line will carry a current uninterruptedly and therefore cathodic protection employed on the line will be continued.

The outer coupling's primary function is the alinement of the pipe and assistance of the pipe keepers in retaining the pipe under tensile stress. Its secondary function is to assist the electrical current transmission for continuous cathodic protection and to act as a permanent damage resistant housing for the internal components of the unit.

The tensile load of the installation approaches the ultimate parting strength of the pipe on which it is used. This is of the utmost importance in marine pipe lines during hurricanes or winter storms or in the event of damage to the line in the immediate vicinity of the couplings. The tensile load is counteracted by the vise-like grip produced by the male members of the pipe keepers which, pursuant to their design, exert a continually greater retentive force on the severed pipe sections as the end pull on the pipe is increased.

Initially the improved device is a flexible joint, facilitating the installation. On setting or hardening, the sealant material causes the joint to become rigid and maintains the pipe sections in alinement, allowing the pigs and internal pipe scratchers to pass uninterrupted.

The coupling parts, particularly of the outer coupling, are vibrated while the sealant material is pumped under pressure into the void between the outer and inner components, resulting in complete permeation of all existing voids. The presence of the sealant in all voids prevents corrosion of the internal parts of the couplings, retaining their integrity for the life span of the pipe line.

The O-rings in the inner coupling are retained against movement and leakage caused by high hydrostatic pressures due to the sealing and "locking" effect of the sealant. This is of extreme importance in the repair of old or badly corroded pipe where other clamps fail through the lack of adequate setting of the O-rings in the corrosion pits.

Due to the high strength attained in the sealant soon after setting, the pipe line can be placed in service in an extremely short period of time after the job is complete, usually within about two hours.

In the event of leakage of the O-rings of the inner coupling there is no danger of a "blowout" as with other types of sleeves and clamps due to the retaining effect of the sealant and outer coupling.

With respect to the pipe keepers the arrangement is such that the greater the outward pull on the two pipe sections, the tighter will the teeth of the keepers bite into the pipe and resist this axial pull in opposite directions from the division. This occurs of course only after the outer walls of the female members abut the end plates of the outer casing so that it is desirable to "set" the keepers upon the pipe sections with these outer walls of the female members as close to the outer casing end plates as can be contrived at the time of the installation.

In any event, the combined axial distances between the two outer end walls of the two female members from their respective outer casing end plates should be such that any allowable movement apart of the two pipe sections in a direction to widen the gap at the division should be less than approximately half the length of the inner coupling or in other words less than the distance that would be required to pull one or the other of the pipe sections out of the inner coupling.

The ideal condition is to have the free ends of the pipe sections at the division abutted but the O-rings of the inner coupling are such that even when continuously subjected to the internal pressure of the high pressure pipe lines is sufficient to withstand such pressure and avoid leakage past the O-rings. In the event of any such escape the pressure will still be maintained by the sealant material and by the outer O-rings of the outer coupling, particularly as the sealant will enter into contact with the outer O-rings 57 internally thereof and cooperate with the same to form a leak-tight joint.

The invention is designed to hold against leakage internal pipe pressures up to 5,000 and 6,000 pounds pressure. The present device has been tested up to 6,500 pounds hydrostatic pressure before any leakage was observed. Such pressures approach the bursting pressure of the pipe itself.

The threaded bolts 34 and 35 are preferably each not less than six in number for the purpose of circular continuity of pressure on the inner O-rings or packing rings 36 and 37. These bolts exert a radially inward pressure on the inner O-rings so that such O-rings are squeezed down all around on the surface of the pipe.

The material of the sealant is such that it expands on setting to place an additional force on all O-rings to retain them in their proper positions against any hydrostatic pressure.

The interior void may be filled with a portland cement composite, manufactured specifically for this purpose. It has a setting time of approximately two hours and a compressive strength of 7,000 p.s.i. in twenty-eight days. The sealant on setting has a slight expansion thus locking the O-rings in the inner coupling or sleeve.

Referring to FIGURES 6 and 7, the pipe section 20 will in instances connect with a horizontal portion of a riser which is the vertical portion of the pipe line which is attached to the side of a marine structure. Some risers are installed on the structure at the site of the structure's fabrication, while others are installed out in the water. Welded onto the bottom of the vertical portion (riser) is a "tube turn" or elbow, which is a piece of angled pipe which has a gradual turning radius of 90 degrees, which causes the bottom section of the riser to be horizontal when the upper portion becomes vertical.

On the installation of pipe line risers, a diver is sent down to the bottom to measure the linear distance between the end of the pipe line, and the side of the structure to which the vertical portion (riser) will be clamped. Once this is accomplished the pipe line is raised to the water's surface and the riser is welded in with a sufficient section of pipe added, or removed, to make up the correct length to reach the structure. If the measurement proves incorrect the procedure is repeated until the line and riser fit.

The pipe line, which will be laid to connect one location to another, having been fabricated on board the derrick barge, is naturally above water initially, but on fabrication completion, is lowered to the bottom and remains there, except in the case where measurements are incorrect. This requires raising to the surface again to make the necessary alterations.

The object of the installation with the coupling is to eliminate the time required for the derrick to repeatedly raise and lower the pipe for measurements and alterations.

The barge's time can be better utilized laying line or be released, stopping the charges being incurred at the rate of $400 to $600 per hour, if the coupling method is used.

In all installations and repair work the inner and outer coupling is utilized since they act as a unit. The outer shell's function is primarily a housing for protection of the inner sleeve, and to retain the female collars in the event of a tensile load on the pipe. The sealant acts as a corrosive preventive, assists in retaining the O-rings in the inner sleeve against leakage caused by high hydrostatic pressure, and lastly prevents the male halves of the collars from releasing and moving inward in the event the pipe sections are for some reason forced towards one another.

Although I have disclosed herein the best form of the invention known to me at this time, I reserve the right to all such modifications and changes as may come within the scope of the following claims.

What is claimed is:

1. A pipe coupling for high-pressure gas and oil underwater pipe lines for coupling end sections of the pipe across a division between said sections comprising
    (a) an inner pipe coupling means bridging the adjacent ends of the pipe sections, fluid seal means sealingly disposed between said coupling means and each of said pipe sections, said coupling permitting limited relative axial movement of said pipe sections,
    (b) an outer pipe coupling means completely enclosing the inner pipe coupling means and radially and axially spaced therefrom,
    (c) means for securing the outer pipe coupling means to the pipe sections against axial movement thereon, under normal axial forces acting thereagainst,
    (d) pipe keeper means fixed to each of said pipe sections between the inner and outer coupling means in the axial space between the inner and outer coupling means, and
    (e) said outer coupling means having the end portions thereof disposed in the path of possible movement of the pipe keeper means as said pipe sections move axially under abnormal axial force acting thereon to engage said pipe keeper means and arrest the said axial movement of the pipe sections.

2. A pipe coupling as claimed in claim 1 in which
(f) a sealant completely fills the space between the coupling means and surrounds and imbeds the inner coupling means and the pipe keeper means to unite the coupling means and the pipe keeper means to form an integral mass to prevent relative axial movement therebetween.

3. A pipe coupling according to claim 1 including
(a) solid round outer coupling packing rings positioned on the pipe sections,
(b) said pipe keepers comprising solid round tubular female members having frusto-conical internal walls located on the pipe sections with the larger diameter ends toward the division,
(c) said inner coupling comprising solid round securing rings located on the pipe sections,
(d) solid round inner coupling packing rings disposed on the pipe sections,
(e) an inner coupling sleeve positioned over the pipe sections, so that it bridges the division with substantially equal axial lengths thereof to opposite sides of the division,
(f) means for tightly drawing the securing rings to respective ends of the sleeve while compressing the inner coupling packing rings between the sleeve ends and the securing rings and radially compressing the inner coupling packing rings against included external walls of the pipe sections,
(g) said pipe keepers also including circularly-contractile male members on the pipe sections on opposite sides of the inner coupling and having oppositely inclined internal teeth positioned to bite into included outer wall portions of the pipe sections in an order resisting relative axial movements of the pipe sections incident to tensile load in directions which would widen the division,
(h) said female members being axially driven over the complementally frusto-conical outer walls of the male members to contract the male members about the pipe sections and cause said teeth to bite into the included pipe sections,
(i) a cylindrically-sectional outer casing enclosing the inner coupling and pipe keepers and having end portions thereof in the paths of the pipe keepers to restrict substantial movement of the pipe keepers and included pipe sections in directions which would cause widening the gap of the division, and
(j) said fluid sealing means is a plastic.

4. A pipe coupling as claimed in claim 1 in which said outer coupling means comprises
(d) a casing composed of circular sections, said parts of the outer coupling means comprising
(e) end plates for engagement by the keeper means, said end plates having circular recesses,
(f) O-rings on the pipe sections occupying said recesses when the casing sections are fitted about the pipe sections, and
(g) means for clamping the casing sections together and forcibly upon said O-rings.

5. A pipe coupling as claimed in claim 1 in which said inner coupling means comprises
(d) a sleeve bridging the division, packing rings fitted against end portions of the sleeve and about the pipe sections in spaced relation to the division, and
(e) securing means fitted outwardly of the packing rings,
(f) the free ends of the sleeve and adjacent ends of the securing means being shaped to compress the packing rings radially inward against the pipe sections incident to the movement of the securing rings against the packing rings.

6. A pipe coupling as claimed in claim 5 in which such shaped end portions of the sleeve and securing means are
(g) beveled surfaces diverging radially inward toward the pipe sections, and
(h) said packing ring having complementally beveled surfaces engaging the beveled surfaces of the sleeve and securing means.

7. A pipe coupling as claimed in claim 6 in which
(i) the securing means are rings extending about the pipe sections and engaging outer portions of the packing rings, and
(j) means for progressively forcing the securing means against the packing rings.

8. A pipe coupling as claimed in claim 3 in which said male members are circularly sectional with gaps between to permit the sections free relative radial contraction.

9. The process of repairing in situ by a diver on the floor of the ocean damaged underwater high-pressure pipe lines comprising
(a) cutting through the line at the damaged area producing a division and two pipe sections,
(b) moving the pipe sections out of axial alinement at the division,
(c) slipping solid round outer coupling packing rings on the pipe sections,
(d) slipping solid round tubular female members of pipe keepers having frusto-conical internal walls on the pipe sections with the larger diameter ends toward the division,
(e) slipping solid round securing rings of an inner coupilng on the pipe sections,
(f) slipping solid round inner coupling packing rings on the pipe sections,
(g) slipping an inner coupling sleeve first over one of the pipe sections, re-alining the pipe sections, shifting the sleeve partially over the other pipe section until the sleeve bridges the division with substantially equal axial lengths thereof to opposite sides of the division,
(h) tightly drawing the securing rings to respective ends of the sleeve while compressing the inner coupling packing rings between the sleeve ends and the securing rings and radially compressing the inner coupling packing rings against included external walls of the pipe sections,
(i) fitting circularly-contractile male members of the pipe keepers to the pipe sections on opposite sides of the inner coupling with their oppositely inclined internal teeth positioned to bite into included outer wall portions of the pipe sections in an order resisting relative axial movements of the pipe sections incident to tensile load in directions which would widen the division,
(j) driving the female members axially over the complementally frusto-conical outer walls of the male members to contract the male members about the pipe sections and cause said teeth to bite into the included pipe sections,
(k) installing a cylindrically-sectional outer casing about the inner coupling and pipe keepers having parts in the paths of the pipe keepers to restrict substantial movement of the pipe keepers and included pipe sections in directions which would cause widening the gap at the division, and
(l) introducing into the casing a plastic sealant material enveloping the pipe sections, inner coupling and pipe keepers.

10. The process of repairing in situ by a diver on the floor of the ocean damaged underwater high-pressure pipe lines comprising
(a) severing the pipe line at the damaged area, producing a division and two separate pipe sections,
(b) installing a tubular sleeve of an inner coupling in bridging relation over the division and fitting in common over adjacent parts of both pipe sections, (c) installing packing between end portions of the sleeve and the respective pipe sections, (d) fitting circularly contractile male members of pipe keepers to the pipe sections on opposite sides of the sleeve with inclined teeth thereof positioned to bite into the outer wall portions of the pipe sections, (e) driving female members axially over the male members to contract the male members about the pipe sections and cause said teeth to bite into the included pipe sections, (f) installing a casing about the inner coupling, sleeve and pipe keepers of materially greater diameter than the pipe sections and inner coupling to afford an entirely closed chamber for sealant material, and (g) introducing into the closed chamber of the casing a plastic sealant expansible material adapted to set and expand and fill all voids in and about the exposed included pipe sections, inner coupling and pipe keepers.

11. The process of repairing in situ by a diver on the floor of the ocean damaged underwater high-pressure pipe lines comprising (a) severing the pipe line at the damaged area producing a division and two pipe sections, (b) slipping solid round O-rings on the pipe sections and moving same in opposite directions remotely from the division, (c) slipping a solid round inner coupling sleeve first over one of the pipe sections at the division and then reversely over the companion pipe section until the sleeve bridges the division, (d) installing packing between the sleeve and the pipe sections in spaced relation to opposite sides of the division, (e) fitting pipe keepers fast to the pipe sections outwardly of opposite end portions of the sleeve, (f) installing a casing about the sleeve and keepers and included portions of the pipe sections to form a completely closed chamber with end plates positioned to be engaged by the keepers incident to movement of the pipe sections in a direction to widen the gap at the division, (g) installing packing between the end plates and the pipe sections, and (h) introducing sealant material into the closed chamber of the casing to envelope the sleeve, pipe keepers and all internal space of the casing and to and against the packing between the end plates and the pipe sections and between any space between the keepers and the casing end plates.

References Cited

UNITED STATES PATENTS

| 334,286 | 1/1886 | Reed | 285—373 X |
|---------|--------|------|-----------|
| 701,209 | 5/1902 | Luke | 285—47 X |
| 796,781 | 8/1905 | Welsh | 29—401 |
| 1,051,086 | 1/1913 | Clark | 285—373 |
| 2,162,184 | 6/1939 | Snyder | 285—369 X |
| 2,451,354 | 10/1948 | Ohls | 285—373 X |
| 2,538,043 | 1/1951 | Roy et al. | 287—114 X |
| 2,759,254 | 8/1956 | Soehnlen et al. | 29—460 X |
| 2,778,662 | 1/1957 | Smith | 285—373 X |
| 2,787,051 | 4/1957 | Risley | 61—72.3 X |
| 2,908,744 | 10/1959 | Bollmeier | 285—297 X |
| 2,971,781 | 2/1961 | Torres | 285—373 X |

FOREIGN PATENTS

| 79,111 | 9/1962 | France. |
| 1,304,761 | 8/1962 | France. |
| 633,136 | 2/1962 | Italy. |

CARL W. TOMLIN, *Primary Examiner.*

R. G. BERKLEY, *Assistant Examiner.*